United States Patent [19]

Gilbert et al.

[11] Patent Number: 5,221,700
[45] Date of Patent: Jun. 22, 1993

[54] PIGMENT GRIND RESIN COMPRISING THE REACTION PRODUCT OF EPOXIDE RESIN, AMINE AND MONOEPOXIDE

[75] Inventors: John A. Gilbert, Birmingham, Mich.; Günther Ott; David J. Santure, both of Münster, Fed. Rep. of Germany

[73] Assignee: BASF Corporation, Southfield, Mich.

[21] Appl. No.: 890,301

[22] Filed: May 27, 1992

Related U.S. Application Data

[63] Continuation of Ser. No. 673,173, Mar. 18, 1991, abandoned, which is a continuation of Ser. No. 289,290, Dec. 22, 1988, abandoned.

[51] Int. Cl.$^5$ .............................................. C08L 63/00
[52] U.S. Cl. ...................................... 523/404; 525/523; 528/103
[58] Field of Search .................. 523/404; 528/103; 525/523

[56] References Cited

U.S. PATENT DOCUMENTS

| | | | |
|---|---|---|---|
| 3,824,111 | 7/1974 | Jerabek | 523/415 |
| 3,925,180 | 12/1975 | Jerabek | 523/414 |
| 3,936,405 | 2/1976 | Sturni et al. | 523/414 |
| 3,947,339 | 3/1976 | Jerabek et al. | 204/181 |
| 4,035,275 | 7/1977 | Sturni et al. | 204/181 |
| 4,071,428 | 1/1978 | Bosso et al. | 204/181 C |
| 4,116,900 | 9/1978 | Belanger | 528/103 |
| 4,134,864 | 1/1979 | Belanger | 523/414 |
| 4,182,831 | 1/1980 | Hicks | 528/103 |
| 4,225,478 | 9/1980 | Hicks | 528/103 |
| 4,339,369 | 7/1982 | Hicks et al. | 523/414 |
| 4,420,574 | 12/1983 | Moriarity et al. | 523/404 |
| 4,423,166 | 12/1983 | Moriarity et al. | 523/414 |
| 4,575,523 | 3/1986 | Anderson et al. | 523/414 |
| 4,608,405 | 8/1986 | DeGooyer | 528/103 |

*Primary Examiner*—John C. Bleutge
*Assistant Examiner*—Frederick Krass
*Attorney, Agent, or Firm*—Kenyon & Kenyon

[57] ABSTRACT

Pigment dispersion resins for use in cathodic electrocoat paint systems are the reaction products of (A) the reaction product of an aromatic diglycidyl ether and a bis-aryl alcohol or aromatic diol; (B) a primary amine which includes a diamine, an amino alcohol, an aminopolyalkoxy alcohol, a fatty amine, or any mixture thereof; and (C) a monoepoxide. In one embodiment, the fatty amine is provided in an effective amount to eliminate the necessity of the inclusion of the monoepoxide.

8 Claims, No Drawings

PIGMENT GRIND RESIN COMPRISING THE REACTION PRODUCT OF EPOXIDE RESIN, AMINE AND MONOEPOXIDE

This application is a continuation of application Ser. No. 07/673,173, filed on Mar. 18, 1991, now abandoned, which is a continuation of application Ser. No. 289,290, filed Dec. 22, 1988, now abandoned.

FIELD OF THE INVENTION

The present invention is related to epoxide compound resins which are useful as pigment dispersion resins for cathodic electrocoat paint systems.

BACKGROUND OF THE INVENTION

Cathodic electrodeposition of a film composed of amine resin, crosslinker, pigment, grind resin and other resinous components onto an electrically conductive article is an important industrial process. It constitutes the usual manner in which automobile and truck bodies as well as appliance and other large metallic surface bodies are undercoated with paint. In addition to providing a painted surface, the resin systems employed protect the underlying metal surface from corrosion, impact damage and other detrimental exposure to environmental conditions.

In performing the electrodeposition, the conductive article forms one electrode and is immersed in a coating bath made from an aqueous dispersion of the film-forming resin and other components. An electrical current is passed between the article and the counter electrode in the electrodeposition bath. A charge on the article causes deposition of the resins and other components in the bath so as to produce the electrodeposited film. The deposited film is then baked or otherwise hardened to yield a coating of a substantially uniform thickness having protective characteristics.

Pigment and pigment grind resins constitute important components of the coating bath and are deposited as part of the coating. Therefore, design characteristics are important for the grind resin as well as the other components of the coating. Such patents as U.S. Pat. Nos. 3,936,405 and 4,035,275, the disclosures of which are incorporated herein by reference, as well as others describing beneficial characteristics for such grind resins.

Pigment grind resins are included in the coating in order to increase the dispersion stability of the inorganic and/or organic pigments which may be present in the coating bath.

Most commercial cathodic electrocoat systems presently used employ a quarternary ammonium functional pigment dispersion/stabilization polymer. For example, U.S. Pat. No. 3,936,405 (Sturni et al.) describes the use of quaternary onium salt group-containing epoxy resins which are prepared by reacting amine salts, phosphine-acid mixtures or sulfide-acid mixtures with a 1,2-epoxy group containing material wherein a ratio of at least 0.4 equivalents of quaternary onium groups are said to be produced for equivalent of epoxy group initially present.

Although quaternary ammonium polymers have been found to be very effective, their preparation can be difficult and inconsistent.

It is therefore an object of the present invention to provide a pigment grind resin which maximizes the dispersing efficiency and dispersion stability of inorganic and organic pigments in an aqueous system.

It is another object of the present invention to provide a pigment grind resin which maximizes dispersing efficiency and dispersion stability which is not a quaternary ammonium polymer.

It is another object of the present invention to provide a pigment grind resin which is compatible with a wide range of electrodepositable resin systems It is yet another object of the present invention to provide a pigment grind resin which is pH dependent and whose pH can be adapted to the pH of the principle amine resin.

SUMMARY OF THE INVENTION

These and other objects are achieved by the present invention which is directed to a pigment dispersion resin comprising the reaction product of (A) the reaction product of
(i) one or more aromatic diglycidyl ethers having the formula

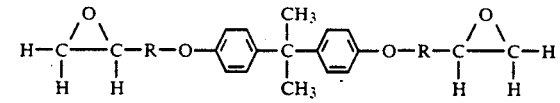

wherein R is alkyl having from about 1 to about 8 carbon atoms or alkoxy having from about 1 to about 8 carbon atoms, and
(ii) one or more bis-aryl alcohols or aromatic diols;
(B) one or more primary amines; and
(C) one or more monoepoxides having the formula

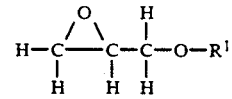

wherein $R^1$ is alkyl having from about 4 to about 24 carbon atoms or aryl substituted with a straight or branched chain of from about 4 to about 24 carbon atoms. In preferred embodiments, the ratio of aromatic diglycidyl ether to bis-aryl alcohol or aromatic diol is from about 8:1 to about 1.5:1, and most preferably from about 3.0:1 to about 2.5:1. The primary amine is used in an amount of from about 0.6 to about 1.2 equivalents per equivalent of monoepoxide. For the purposes of the present invention, equivalents are defined as the number of primary amine or epoxide functionalities present on the reactant.

The molecular weight of the reaction product of the aromatic diglycidyl ether and the bis-aryl alcohol is preferably from about 300 to about 3000, and most preferably from about 340 to about 360. It is also preferred that the total molecular weight of the pigment grind resin of the present invention be from about 1500 to about 6000, and most preferably from about 2000 to about 3000.

The primary amine may be an amino alcohol, an aminopolyalkoxy alcohol such as polyglycolamine, a mixture of an amino alcohol and a diamine, a fatty amine, a mixture of a fatty amine and one or more of an amino alcohol, an aminopolyalkoxy alcohol, and a diamine. In a most preferred embodiment of the present invention, the aromatic diglycidyl ether comprises the diglycidyl ether of bisphenol A, the bis-aryl alcohol or aromatic diol comprises one or more of bisphenol A, hydroquinone and resorcinol, and the monoepoxide preferably comprises nonylphenolglycidyl ether. In one embodiment of the present invention, the primary amine comprises a mixture of 9-amino-3,6-dioxanonan-1-ol and dimethylaminopropylamine in a ratio of about 1:0.4 to about 1:1.5, and most preferably about 1:0.67 to about 1:1.5. In another embodiment of the present invention, the primary amine comprises a fatty amine. In this embodiment, the monoepoxide may be omitted. However, in addition to the fatty amine, the other aforementioned primary amines and the monoepoxide may be included if desired.

The present invention also relates to pigment paste comprising the pigment grind resin of the present invention and one or more pigments in a ratio of from about 1:2 to about 1:6.

The present invention also relates to aqueous electrodeposition compositions formed from the combination of a pigment paste comprising the grind resin of the present invention and one or more pigmenting agents, a principal emulsion of a principal resin and crosslinking agent, and water having a solids content from about 5 percent to about 35 percent by weight.

These grind resins are very effective pigment grind resins for cathodic electrocoat systems and produce films having an excellent appearance. The coatings exhibit excellent corrosion resistance.

DETAILED DESCRIPTION

The aromatic diglycidyl ethers which may be used in the present invention have the formula

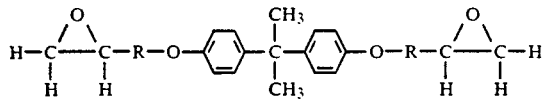

wherein R is an alkyl having from about 1 to about 8 carbon atoms or alkoxy having from about 1 to about 8 carbon atoms. Preferably, the aromatic diglycidyl ether comprises the diglycidyl ether of p,p'-dihydroxydiphenylpropane (commonly referred to as bisphenol A).

The syntheses of the diglycidyl ether compounds follow procedures known in the art. In such fashion, epihalohydrins such as epichlorohydrin, epibromohydrin or epiiodohydrin are reacted with diol precursors to form the bis-glycidyl ether. Reaction conditions include use of an aprotic, polar solvent and an acid scavenger such as aqueous sodium hydroxide or other similar hydroxide base under about stoichiometric proportions and a temperature of from about 0° C. to about 100° C., preferably about ambient temperature.

The bis-aryl alcohols or aromatic diols used in the present invention have the formula HO-Ar-OH, wherein Ar is selected from the group consisting of phenylene; phenylene substituted with halogen, alkoxy of about 1 to about 6 carbon atoms, or alkyl of 1 to 6 carbon atoms; naphthalene; polyphenylene having two or three phenylenes linked by carbon-carbon bonds or alkylene groups having about 1 to about 6 carbon atoms; and naphthalene or a polyphenylene as defined above substituted with halogen, or alkyl of about 1 to about 6 carbon atoms, or alkoxy of about 1 to about 6 carbon atoms. Preferably, the bis-aryl alcohol or aromatic diol comprises one or more of bisphenol A, hydroquinone and resorcinol.

The aromatic diglycidyl ethers and bis-aryl alcohol or aromatic diol are combined according to the invention in any of several combinations to produce the backbone structure of the resins of this invention. The addition reaction oligomers formed from the combination of aromatic diglycidyl ether and bis-aryl alcohol or aromatic diol monomers contain alternating units of aromatic diglycidyl ethers and bis-aryl alcohols or aromatic diols. It is believed that during the reaction, the hydroxy groups of the bis-aryl alcohols or aromatic diols react with the epoxide groups of the aromatic diglycidyl ether monomeric unit so as to open the epoxide ring and form a secondary alcohol group within the aromatic diglycidyl ether monomeric unit and an ether linkage between the bis-aryl alcohol or aromatic diol and aromatic diglycidyl ether monomeric units.

The distribution of aromatic diglycidyl ether monomers and bis-aryl alcohol or aromatic diol monomers, when more than one of each is present, may be random or ordered. In producing a random distribution, the bis-aryl alcohol or aromatic diol and aromatic diglycidyl ether monomers are combined as a gross mixture at the beginning of the reaction. In producing an ordered distribution of aromatic diglycidyl ether and bis-aryl alcohol or aromatic diol monomer addition will be sequential so that a block of the first aromatic diglycidyl ether and a particular bis-aryl alcohol or aromatic diol will first be produced and then a second aromatic diglycidyl ether and bis-aryl alcohol will be added to form second blocks grafted to the first blocks.

It is preferred to use an excess of aromatic diglycidyl ether to bis-aryl alcohol or aromatic diol so that the reaction product will be terminated with epoxide groups. Preferably, the ratio of aromatic diglycidyl ether to bis-aryl alcohol or aromatic diol is from about 8:1 to about 1.2:1, and most preferably from about 2.5:1 to about 3:1.

The oligomeric molecular weight of the backbone structure may be from about 300 to about 3000. The ratio of the sum of aromatic diglycidyl ether monomer equivalents to the sum of bis-aryl alcohol or aromatic diol monomer equivalents used for the addition reaction to form the oligomers will be calculated so as to yield a molecular weight within this range. The equivalents of aromatic diglycidyl ether or bis-aryl alcohol or aromatic diol is calculated by dividing the molecular weight of aromatic diglycidyl ether, bis-aryl alcohol, or aromatic diol by the number of hydroxyl or epoxide groups present in the respective molecule. The range of equivalents of bis-aryl alcohol or aromatic diol to aromatic diglycidyl ether ratios appropriate for generation of this molecular weight range will be from 1:1.2 to about 1:8. The preferred molecular weights lie in the range of from about 300 to 3000 and especially preferred are molecular weights of about 680 to 720. The ratio of bis-aryl alcohol or aromatic diol to aromatic diglycidyl ether equivalents which produces these preferred molecular weights will be from about 1:1.2 to about 1:8.

Appropriate adjustment of the ratio of the reactants and reaction conditions will also affect the molecular weight and sequence of the aromatic diglycidyl ethers and bis-aryl alcohols present in the oligomers. Those skilled in the art will understand the variations and the effects they have upon the oligomeric character.

Generally, the extent of addition will increase with both the time and temperature of the reaction so that the desired molecular weight will be achieved through use of periods of about 2 to 4 hours and temperatures of about 140° C. to 170° C. However, the reaction usually is self-limiting so that further time or temperature adjustment will not increase the limiting molecular weight.

Lewis bases are generally used as catalysts to promote the addition of the bis-aryl alcohol or aromatic diol monomers to the aromatic diglycidyl ether monomers. It is preferred to use a triaromatic phosphine such as triphenyl phosphine as well as tetraalkyl phosphonium salts.

Generally, organic solvents typically are used as a reaction medium for the production of the addition reaction oligomer epoxide compound. Included are such exemplary solvents as aliphatic ketones, for example methyl ethyl ketone or methyl isobutyl ketone as well as aromatic solvents like toluene or xylene, polyethers and glycol ethers, and also alcohols.

A large number of different primary amine functional capping agents can be added to the backbone structure of the present invention. More particularly, it is believed that the primary amines react with the epoxy end groups of the backbone structure so as to open the epoxide ring and form a secondary alcohol group with the backbone structure and a secondary amine. These primary amines may serve a number of different functions, including surface wetting, providing basicity, solubility, and lipophilicity. Another characteristic which the primary amine may provide is allowing the grind resin to be soluble in the bath to which it is to be added.

Suitable primary amines for increasing the solubility of the backbone structure are amino alcohols such as diethanolamine or aminopolyalkoxy alcohols such as Polyglycol Amine H-163, an ethoxylated species having the chemical formula $H_2N-(CH_2)_3-(O-CH_2CH_2-)_2-OH$ and commercially available from Union Carbide Corporation, or 2,2'-aminoethoxyethanol, available from BASF, AG, Ludwigshafen, FRG. Other suitable primary amines for adjusting the solubility of the backbone structure are hydroxyalkyl alkyl amines, dihydroxyalkylamines. In addition, aromatic and aliphatic can also be employed which optionally possess functional groups containing oxygen, sulfur, halogen or nitroso. Examples are monoethanol-amine, 4-aminobenzoic acid, aminopropionic acid, N-(hydroxyethyl)ethylene diamine, anthranilic acid, and p-aminophenol. Other suitable primary amines have aliphatic chains of from about 1 to about 24 carbon atoms. The aliphatic chains may be ethoxylated at one end. The chain length of the oligoether portion is not more than 7 units of ethylene oxide.

Suitable primary amines for increasing the basicity of the backbone structure include diamines such as dimethylaminopropylamine. Examples of other diamines which are suitable include ethylene diamine, 1,2-propylenediamine, 1,3-propylenediamine, 1,2-butylenediamine, 1,3-butylenediamine, 1,4-butylenediamine, 1,5-pentylenediamine, 1,6-hexylenediamine, and the like. Aromatic diamines such as the phenylene diamines and the toluene diamines can also be employed. Examples of these amines are p-phenylenediamine and p-toluenediamine. N-alkyl and N-aryl derivatives of the above amines can be employed such as N,N-dimethyl-o-phenylenediamine, N'N'-di-p-tolyl-m-phenylenediamine, and p-aminodiphenylamine.

Typically, the amount of primary amine used is proportional to or in excess of the stoichiometric equivalents of the epoxide present. Preferably, the ratio of primary amine to backbone structure is from about 0.6:1 to about 1.2:1, and most preferably from about 0.85:1 to about 1:1.

The primary amine also functions to allow the grind resin of the present invention to be adapted for use with any number of electrocoating systems. Thus, for example, the inclusion of a greater proportion of a basic amine such as dimethylaminopropyl-amine will provide a grind resin product with greater solubility in higher pH baths, and therefore greater compatibility with more basic primary emulsions (i.e., pH=6–8.5). Likewise, the inclusion of a greater proportion of an amino alcohol such as 9-amino-3,6-dioxanonan-1-ol will render the grind resin produced more soluble in acidic baths, and therefore more compatible with more acidic primary emulsions (i.e., pH=2–6).

Next, a monoepoxide is reacted with the now-secondary amine functional polymer. More particularly, it is believed that the secondary amine reacts with the epoxy end of the monoepoxide so as to open the epoxide ring, thereby converting the secondary amine to a tertiary amine and forming another secondary alcohol.

The monoepoxides which are useful in the present invention have the formula

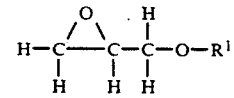

wherein $R^1$ is alkyl having from about 4 to about 24 carbon atoms or aryl substituted with a straight or branched chain of from about 4 to about 24 carbon atoms. The amount and type of monoepoxide used may be varied depending upon the final properties required. For instance, preferred monoepoxides include alkylaryl epoxides such as nonylphenolglycidyl ether and 2-ethylhexylglycidyl ether.

The monoepoxide serves to provide the grind resin of the present invention with a lipophilic tail. This is important because it enhances pigment wetting characteristics and also provides steric stabilization. In addition, the monoepoxide acts as a primary amine scavenger, reacting with remaining primary amine. These free primary amines are undesirable in an electrocoat system because they adversely affect bath conductivity, bath stability, plating characteristics, and corrosion performance.

The ratio of primary amine to monoepoxy moieties has an effect upon the total molecular weight of the grind resin which is produced, as well as upon the basicity and grinding characteristics of the grind resin produced. Typically, the amount of monoepoxide used is roughly equal to or less than the stoichiometric equivalents of the secondary amine present. When a monoepoxide is used, the ratio of the primary amine to monoepoxide is from about 1 to about 10 equivalents, preferably from about 1.4 to about 2 equivalents, of primary amine per equivalent of monoepoxide. Most preferably, the ratio of primary amine to monoepoxide is about 1.7 equivalents primary amine per equivalent of monoepoxide.

In another embodiment of the present invention, the primary amine can provide all or part of the lipophilicity of the backbone structure. In this embodiment, the primary amine comprises fatty nitrogen chemicals including amines, amides and amine acetates. Preferably, the primary amine comprises aliphatic fatty amines and their ethoxylated derivatives, and have from about 7 to 24 carbon atoms. Examples of suitable fatty amines include Adogen cocoa amines. One preferred fatty amine is Adogen 160, which is commercially available from Sherex Chemical Co., Inc., P.O. Box 646, Dublin, OH.

The use of an effective amount of fatty amines in the present invention provides the backbone structure with sufficient lipophilicity such that only a small amount or no monoepoxide need be included. The fatty amine need not entirely replace the use of amino alcohols, diamines, and monoepoxides, and these ingredients may also be included in this embodiment of the invention to the extent desired.

In preparing the pigment grind resins of the present invention, the aromatic diglycidyl ether and the bis-aryl alcohol or aromatic diol are reacted at a temperature of about 100° C. to about 180° C. for a time sufficient to react all of the bis-aryl alcohol with the aromatic diglycidyl ether, generally about one hour to about two hours. The primary amine is reacted with the backbone structure thus formed at a temperature of about 50° C. to about 120° C. for a time sufficient to complete the epoxide-amine reaction, about one to about two hours. Finally, the monoepoxide is reacted with the secondary amine functional polymer thus formed at a temperature of about 70° C. to about 100° C. for a time sufficient to react all of the monoepoxide with the secondary amines found in the backbone structure, and any unreacted primary amines left in the solution, generally about one to about two hours.

A grind resin is then easily produced by neutralizing the polymer formed from about 50 to about 100 percent with a suitable acid such as acetic acid. Other suitable acids include water soluble organic or inorganic acids such as formic acid, lactic acid, phosphoric acid, sulfuric acid, hydrochloric acid, and the like. The extent of neutralization depends upon the particular resin and it is only necessary that sufficient acid be added to solubilize or disperse the resin.

The pigment grind resin of the present invention may be combined with one or more pigments to form a pigment paste. Suitable pigments with which the grind resin of the present invention can be used include carbon black, titanium dioxide, strontium dioxide, lead oxide, strontium chromate, talc, barium sulphite, barium yellow, cadmium red, chromic green, lead silicate, iron oxides, various clays (including ASP 200, a kaolin clay commercially available from Englehard Corporation, Menlo Park C28, Edison, NJ 08818), lead and zinc sulfate, various dyes such as Orasil RL, available from Ciba-Geigy Corporation, and/or other pigments necessary for the production of color. This list is not meant to be exclusive.

The ratio of the pigment to grind resin may be from about 2:1 to about 6:1. Preferably, ratio of pigment to grind resin is from about 2.5:1 to about 3.5:1. The pigment pastes generally have about 55 percent nonvolatiles, and a 3:1 ratio of P:B (pigment to binder resin). Nonvolatiles are defined herein as materials which are not volatilized under the conditions of ASTM D2369-86.

Aqueous electrodeposition compositions are formed from the combination of the pigment grind resin formulations of the present invention, principal emulsions, and water to provide a solid content of from about 5% to about 35% by weight. The ratio cf weights of the pigment grind resin formulations to the principal resin emulsions are from about 1:2 to about 1:10. The pH of the electrodeposition compositions may be from about 2 to about 8.5 and the ratio by weight of the amine resins to crosslinking agents in the electrodeposition compositions may be from about 0.67:1 to about 5:1.

The pigment pastes of the present invention may be mixed with a wide range of principal emulsions to form electrodeposition baths. These principal emulsions generally have a nonvolatile content of about 35 percent. Generally, the baths in which the grind resins of the present invention are used include 22 percent nonvolatiles and a P:B ratio of about 1:3. A preferred generic formula for a suitable bath which includes the grind resin of the present invention will include from about 20 weight percent to about 60 weight percent emulsion, from about 5 weight percent to about 25 weight percent pigment paste, and from about 20 weight percent to about 60 weight percent water; for example, about 42% emulsion, about 13% pigment paste, and about 45% water.

A preferred coating composition is composed of a principal resin, a cross-linker, a plasticizing agent, an optional anti-cratering agent, pigments, and the grind resin of the present invention. The principal resin is a polyamine self-condensed epoxy adduct having pendant alkylphenoxy groups. The cross-linker is a blocked isocyanate or polyisocyanate compound such as toluene diisocyanate compounds, blocked isocyanurates of hexane diisocyanate, or mixtures thereof. The plasticizer may be any surfactant compound which functions to reduce viscosity and enable film flow and leveling. Preferred surfactants are poly(alkylene oxide) alcohol compounds. The optional anti-cratering agent is a polyacrylate resin having pendant alkyl, aromatic and dialkylamino groups. The pigments are selected from inorganic, organometallic and organic compounds contributing either color, bulk, filler or catalytic properties to the composition.

When combined with this principal emulsion, the grind resin of the present invention preferably includes a primary amine component comprising a mixture of 9-amino-3,6-dioxanonan-1-ol and dimethylaminopropylamine in a ratio of about 1.24:1.

Another example of a principal emulsion which the pigment paste of the invention may be adapted for use with comprises 812.8 parts of the principal resin comprising 1881.7 parts of triethylene tetramine, 1941.8 parts of an epoxide resin, 700 parts ethylene glycol monoethyl ether and 458.3 parts of the glycidyl ether of mixed fatty alcohols containing predominantly n-octyl and n-decyl groups, 452.7 parts of a crosslinker comprising TMP/TDI/ethylene glycol monopropyl ether, 14.2 parts of 90% acetic acid and 1220.3 parts water. This principal resin is disclosed in Example II, first paragraph of U.S. Pat. No. 4,134,864. The principal emulsion can be made by mixing all of the components except water and then slowly adding the water with agitation.

Other examples of principal emulsions which can be combined with the pigment paste of the present invention include those prepared with principal resins such as polyamine-terminated epoxy resins, amine-terminated resins, chain extended versions thereof wherein the chain extenders are polyols, polyester polyols, polyether polyols, polyamines, polyester polyamines, and polyether amines. These emulsions will also contain crosslinkers such as blocked isocyanates, blocked poly-isocyanates, transesterification compounds, transamidation compounds, aminoplasts and mixtures thereof. Preferred resins include those disclosed in Example 9 of U.S. Pat. No. 4,134,864; the emulsion in Example D from U.S. Pat. No. 4,596,744; the emulsion in Example D in which "A" is replaced by the TMP/TDI/ethylene glycol monopropyl ether crosslinker previously defined; the emulsion in Example 1 in U.S. Pat. No. 4,713,406; the emulsion in Example 2 in the U.S. Pat. No. 4,721,758; and the emulsion in Example 2 in U.S. Pat. No. 4,724,254. All of the above-mentioned patents are hereby incorporated by reference.

Generally, the principal resin emulsions and pigment grind resin formulations are combined to form the electrodepositon compositions shortly before use in the electrodeposition baths. The electrodeposition compositions may be further diluted with water and other components such as coalescing agents, anti-cratering agents, film build agents, surfactants, anti-pitting agents and the like to produce the baths. Sufficient quantities of the principal resin emulsions and pigment grind resin formulations are used so that the coating produced on a substrate in the baths will have sufficient thickness so that baking will provide such desired characteristics as a smooth surface, high build and effectiveness in a low temperature cure. In addition, the bath proportions of compositions should enable short coating time at a low temperature.

The electrodeposition process typically takes place in an electrically insulated tank containing an electrically conducting anode which is attached to a direct current source. The size of the tank will depend on the size of article to be coated. Typically, the tank will be constructed of stainless steel or mild steel lined with a dielectric coating such as epoxy impregnated fiberglass or polypropylene. The typical size of an electrodeposition dip tank used for such articles as automobile or truck bodies will be designed to contain from about 50,000 to about 500,000 liters of electrodeposition bath.

Adjustment of deposition parameters such as voltage, the time, the bath temperature, the percent solids content, the acidity and the like of the aqueous electrodeposition bath in the dip tank will promote appropriate deposit of the desired film. To this end, a period of immersion of about 1 minute to about 4 minutes and a DC voltage for the electric current of about 100 volts to about 500 volts and a percent solids in the bath of about 18% to about 30% are used with 350 volts voltage, 88° F. (31° C.) temperature, 2 minute period of immersion and 22% solids being preferred.

After the films have been produced by the electrodeposition process, the film-coated substrate bodies are removed from the dip tank and the excess bath solids are rinsed off. The film-coated substrate bodies are then placed into an oven where they are cured or hardened. In general, the film-coated substrate bodies are heated to a temperature from about 149° C. to 204° C., preferably 163° C. to about 177° C. for a period of approximately 20 to about 25 minutes to effect the hardening or crosslinking reaction.

DETAILED DESCRIPTION OF THE PREFERRED EMBODIMENTS

The following examples are illustrative of the present invention but are not meant to limit the scope thereof. Parts and percentages used are parts and percentages by weight, unless otherwise indicated.

EXAMPLE 1

This general procedure was used to prepare a grind resin according to the present invention. First, 27.81 parts of the diglycidyl ether of bisphenol A and 1.44 parts of xylene were charged into a reaction vessel. The charge was heated to 82° C. under a dry nitrogen atmosphere. Next, the heating of the reaction vessel was discontinued and a charge of 5.81 parts bisphenol A was added. The heating of the reaction vessel was then continued to a temperature of 127° C. At this time, the reaction exothermed on its own, with a peak of about 149° C.–160° C. The mixture was held above 149° C. until a EEW (epoxide equivalent weight) of 350±10 was achieved.

Once the EEW of 350 was achieved, 21.08 parts ethylene glycol monobutyl ether was added to the reaction vessel and the bath was then cooled to 90° C.

After a temperature of 90° C. was achieved, a mixture of 7.77 parts of polyglycolamine and 4.07 parts dimethylaminopropylamine were added to the reaction vessel over a period of 6 minutes. The batch exothermed to 104° C.–110° C., and the exotherm was held at or below 115° C. for one hour. Next, a pump flush of 0.53 parts ethylene glycol monobutyl ether was added and thereafter 4.92 parts ethylene glycol monobutyl ether was charged into the reaction vessel and the batch was cooled to 77° C. Next, 14.9 parts nonylphenolglycidyl ether was charged into the reaction vessel. The batch exothermed to 88° C.–93° C., and the batch was held at this temperature for one hour.

Next, a pump of 1.53 parts ethylene glycol monobutyl ether was added and then 10.03 parts ethylene glycol monobutyl ether was charged into the reaction vessel and the batch was cooled to 66° C. The resultant product was then drummed off through 25 micron filter bags.

The nonvolatile content of the grind resin prepared in Example 1 was determined to be 60.0%, the weight per gallon was 8.53 and the viscosity was about 4900 centipoise at 25° C.

EXAMPLES 2-11

Examples 2-11 were prepared to determine the effect of a change in the amine add time and a change in the solids of the resin during the amine add step upon the grind resin. Thus, Examples 2-11 were prepared in accordance with the procedure set forth for Example 1, with the exception that the amine add time and solids content were varied. Table 2 sets forth the resin variables for Examples 2-11.

TABLE 2

| | Resin Variables Used | |
|---|---|---|
| Example | Amine Add Time (Hours) | Percent Solids |
| 2 | 2 | 50 |
| 3 | 6 | 50 |
| 4 | 10 | 50 |
| 5 | 2 | 60 |
| 6 | 6 | 60 |
| 7 | 10 | 60 |
| 8 | 2 | 70 |
| 9 | 4 | 70 |
| 10 | 6 | 70 |
| 11 | 10 | 70 |

Neutralization ladders with acetic acid were run on the resins prepared in Examples 2-11. All of the resins had a hazy appearance at 50% neutralization and were clear at 75% neutralization. The pH and appearances of Examples 2-11 at various stages of the neutralization process are provided in Table 3.

TABLE 3

Neutralization Ladder

| Example | 25% Neutralization pH | 25% Neutralization App. | 50% Neutralization pH | 50% Neutralization App. | 75% Neutralization pH | 75% Neutralization App. | 100% Neutralization pH | 100% Neutralization App. |
|---|---|---|---|---|---|---|---|---|
| 2 | 9.02 | Milky emul. | 7.91 | Hazy | 6.49 | Clear | 5.44 | Clear |
| 3 | 8.83 | Milky emul. | 7.65 | Hazy | 6.62 | Clear | 5.30 | Clear |
| 4 | 9.06 | Milky emul. | 7.76 | Hazy | 6.80 | Clear | 5.28 | Clear |
| 5 | 9.76 | Milky emul. | 7.99 | Hazy | 6.78 | Clear | 5.54 | Clear |
| 6 | 9.29 | Milky emul. | 7.98 | Hazy | 6.83 | Clear | 5.41 | Clear |
| 7 | 9.32 | Milky emul | 7.94 | Hazy | 6.52 | Clear | 5.52 | Clear |
| 8 | 8.56 | Milky emul. | 7.57 | Hazy | 6.27 | Clear | 5.20 | Clear |
| 9 | 8.67 | Milky emul. | 7.68 | Hazy | 6.26 | Clear | 5.26 | Clear |
| 10 | 8.68 | Milky emul. | 7.94 | Hazy | 6.51 | Clear | 5.66 | Clear |
| 11 | 8.60 | Milky emul. | 7.72 | Hazy | 6.58 | Clear | 5.44 | Clear |

EXAMPLE 12

The resins of Examples 2-11 used to prepare gray pigment pastes. Pastes were formulated according to Table 4 below, using as standard parameters 56% nonvolatile content and a P:B ratio of 3:1.

TABLE 4

Paste Formula

| Component | Total Wt | NV Wt | Pig Wt | Bind Wt | % PS | % Total |
|---|---|---|---|---|---|---|
| Grind resin | 198.3 | 119.0 | — | 119.0 | — | 19.83 |
| Acetic Acid | 11.1 | — | — | — | — | 1.11 |
| Defoamer (Tristar 27) | 7.0 | — | — | — | — | 0.70 |
| Carbon Black | 12.6 | 12.6 | 12.6 | — | 3.0 | 1.26 |
| Lead Silicate (Basic White Lead) | 14.7 | 14.7 | 14.7 | — | 3.5 | 1.47 |
| Clay Extender | 63.0 | 63.0 | 63.0 | — | 15.0 | 6.30 |
| Titanium Dioxide | 329.7 | 329.7 | 329.7 | — | 78.5 | 32.97 |
| Dibutylin Oxide (Fine Ground) | 21.0 | 21.0 | — | 21.0 | — | 2.10 |
| DI Water | 342.6 | — | — | — | — | 34.26 |
| Totals | 1000.0 | 560.0 | 420.0 | 140.0 | (100.0) | (100.0) |

Formulated For: 56.0% N.V. Before Reduction
Grind Resin Parameters 60.0% N.V.; 489 AEW
Neutralization 75.0%

The initial and grinding viscosities of Examples 2-11 were similar as can be seen from the results set forth in Table 5. The grinding temperature was maintained in the range of 32° C.-46° C. The grinding parameters of the pastes formed from Examples 2-11 are provided in Table 6. All of the pastes ground to 8-10 μ in three passes through a vertical sand mill.

TABLE 5

Viscosity

| Example | Initial Viscosity (Centipoise) | Grinding Viscosity (After letdown with Water) (Centipoise) |
|---|---|---|
| 2 | 91 | 74 |
| 3 | 92 | 68 |
| 4 | 90 | 72 |
| 5 | 86 | 75 |
| 6 | 92 | 71 |
| 7 | 85 | 73 |
| 8 | 100 | 74 |
| 9 | 86 | 70 |
| 10 | 98 | 74 |
| 11 | 88 | 72 |

TABLE 6

Grinding Parameters

| Example | Pass #1 Temp. | Pass #1 F.O.G.* (μ) | Pass #2 Temp. | Pass #2 F.O.G.* (μ) | Pass #3 Temp. | Pass #3 F.O.G.* (μ) |
|---|---|---|---|---|---|---|
| 2 | 34° C. | 21 | 35° C. | 14 | 36° C. | 9 |
| 3 | 41° C. | 24 | 39° C. | 15 | 36° C. | 10 |
| 4 | 32° C. | 22 | 32° C. | 14 | 34° C. | 10 |
| 5 | 34° C. | 22 | 36° C. | 14 | 37° C. | 8 |
| 6 | 35° C. | 24 | 36° C. | 15 | 37° C. | 10 |
| 7 | 37° C. | 24 | 38° C. | 14 | 39° C. | 9 |
| 8 | 32° C. | 19 | 34° C. | 14 | 32° C. | 10 |
| 9 | 33° C. | 20 | 34° C. | 14 | 34° C. | 10 |
| 10 | 35° C. | 22 | 34° C. | 16 | 46° C. | 10 |
| 11 | 36° C. | 23 | 37° C. | 15 | 38° C. | 10 |

*F.O.G. = Fineness of grind

EXAMPLE 13

Samples of the pastes prepared in Example 12 were subjected to ageing in an oven for sixteen hours. The results, which were very good for all pastes, are provided in Table 7. No water separation or settling was observed and no significant increase in the fineness of grind was observed. In sum, all of the resins of Examples 2-11 made good pastes without exhibiting any abnormalities with regard to grinding or processing of the paste.

TABLE 7

16 Hour Heat Ageing Test

| Example | Final % Nonvolatiles | Finess of Grind (%) | Separation | Settling |
|---|---|---|---|---|
| 2 | 54.3 | 9 | No | No |
| 3 | 53.9 | 10 | No | No |
| 4 | 54.7 | 10 | No | No |
| 5 | 53.7 | 9 | No | No |
| 6 | 53.9 | 10 | No | No |
| 7 | 54.3 | 12 | No | No |
| 8 | 54.6 | 14 | No | No |
| 9 | 54.0 | 12 | 1 drop | No |
| 10 | 54.9 | 11 | 2 drops | No |
| 11 | 54.0 | 10 | No | No |

EXAMPLE 14

Baths were prepared using the pastes prepared in Example 12. The baths were prepared as follows: approximately 1900 parts of the principal emulsion, prepared as described below (32% N.V., 600 N.V. parts), about 525 parts of pigment paste, about 23 parts of an acrylic flow solution, prepared as described below in Table 8, about 1600 parts of water, about 20 parts Dowanol PPH (Dow Chemical Co., Midland, MI) and about 1 part 25% acetic acid were combined at ambient temperature and mixed for about one hour. The bath solids were adjusted with aqueous acid, if necessary, to yield a solids content of about 21-24%.

TABLE 8

| Component | Flow Agent Solution | |
|---|---|---|
| | Total Wt. | NV Wt. |
| Acrylic Flow Resin* 25% | 285.7 | 229.1 |
| Acetic Acid | 54.9 | — |
| DI Water | 659.4 | — |
| Totals | 1000.0 | 229.1 |

*Prepared by free radical polymerization of 20 wt. % butyl acrylate, 58 wt. % 2-hydroxyethyl acrylate, 20 wt. % dimethylaminoethyl methacrylate and 2 wt. % styrene.

Preparation of Principal Resin

Xylene is added to a clean dry reactor. The mixing liquid is blanketed with pure $N_2$ and heated to 42° C.

Solid epoxy (characteristics and weights in Table 9) is added at such a rate that the batch temperature never drops below 60° C., usually over a period of two hours. Heating is continued until 100° C.

TABLE 9

| Characteristics and Weights of Ingredients | |
|---|---|
| Weight | Ingredient |
| 81.1 | Xylene |
| 33.9 | Xylene |
| 568.1 | EPON 1001 (EEW = 530 ± 10) |
| 75.9 | Dodecyl phenol |
| 1.1 | BDMA |
| 42.1 | Ethylene glycol monobutyl ether |
| 74.7 | Xylene |
| 42.6 | DEOA |
| 40.6 | Ethylene glycol monohexyl ether |
| 107.7 | Isobutanol |
| 13.3 | DMAPA |
| 1000.0 | Total Weight Principal Resin 70% N.V. |

At this point, the dodecyl phenol is added and then heated to 118° C. Vacuum drying by distillation of xylene is started at this temperature and continued heating to 125° C. The pressure should be between 66 cm and 69 cm of Hg (88 kP-92 kP). The drying stage should take about one hour. Break vacuum with pure nitrogen only. The batch is cooled to 115° C. The sample at this point should be % nonvolatiles (%N.V.)=95.0±0.5.

At 115° C. benzyldimethylamine (BDMA) is added. The peak exotherm temperature should reach 129° C.-132° C. The temperature is maintained at 130° C.±2° C. and the polymerization is followed by EEW (epoxide equivalent weight) titration. Every 30 minutes the reaction is sampled and is stopped at an end point of 1100±10 EEW. The typical reaction time is 3 hours. Adjustments to the catalyst level may be necessary if extension period is ±30 minutes from 3 hours.

At the target EEW, the reducing solvents are added followed by diethanol amine (DEOA).

The temperature of this reaction should not exceed 132° C. Cooling may be necessary at this point with jacket or coils. A vacuum suction is started immediately after the DEOA addition and pressure is reduced to 18 inches of Hg and held for 5 minutes. The pressure is further reduced in 2 inch Hg increments followed by short holding period until 26-27 inches of Hg is achieved. The batch is then cooled to 90° C. in one hour following addition of DEOA. To achieve this a good reflux rate should be attained in 20-25 minutes after the DEOA addition. All solvents are returned to the reactor.

After one hour of vacuum cooling, (T=90° C.), ethylene glycol monohexyl ether and isobutanol are added without breaking vacuum. The batch is cooled for 35 minutes to about 60° C. under full vacuum.

The dimethylamino propyl amine (DMAPA) is charged as fast as possible after the 35 minute cooling period. The batch temperature is kept below 63° C. The batch is held is kept between 54° C. and 60° C. for two hours after exotherm. Then it is heated 90° C. over one hour and this temperature is held for one hour. The batch is cooled to 80° C.

Preparation of Crosslinking Agent I

A blocked isocyanate cross-linking agent (polyurethane cross-linking agent) is prepared according to the following procedure. Slowly and with stirring in a nitrogen atmosphere 291 parts of an 80/20 isomeric mixture of 2,4-/2,6-toluene diisocyanate, 0.08 parts of dibutyltin dilaurate and 180 parts of methyl iso-butyl ketone are added, the temperature being maintained below 38° C. The mixture is maintained at 38° C. for a further half hour after which 75 parts of trimethylolpropane are added. After allowing the reaction to proceed for about 10 hours, 175 parts of ethylene glycol monopropyl ether is added and the mixture reaction kept 1.5 hours at 121° C. until essentially all the isocyanate groups are reacted. This depletion is recognized from the infrared spectrum.

Another blocked isocyanate can be prepared by altering the foregoing order of addition pursuant to Example 1 of German Offenlegungsschrift 2,701,002.

Preparation of Cross-linking Agent II

A blocked isocyanate crosslinker (polyurea) is prepared according to the following procedure. Four-hundred-eighty-three parts of triisocyanurated hexamethylendiisocyanate and 193 parts of 2-hexanone are charged to a dry reactor. Dibutylamine (307 parts) are added slowly and with stirring under nitrogen atmosphere so that the temperature does not exceed 80° C. After all amine has reacted 14 parts of n-butanol and 0.2 parts of dibutyltin dilaurate are added. The reaction mixture is heated to 80° C. until no isocyanate groups can be detected by infrared analysis.

Preparation of Emulsion

With the foregoing principal resin stirring at 80° C. the acetic acid and plasticizer, Paraplex WP-I (sold by Rohm & Haas) are added, followed by addition of crosslinker I prepared as described above. The resin mixture at this point should be at about 56° C. It is mixed for 15 minutes.

Then, the resin premix and acid as formulated above are added with agitation to the $H_2O$ and Surfynol 104 (50% in ethylene glycol monobutyl ether) starting at 25° C. Good mixing is important here, (N.V.=55%). The temperature at this point should be 37° C. to 40° C. The mix is stirred for the next portion of $H_2O$. It is held and mixed 30 minutes. The temperature should be between 30° C. and 32° C. The remaining water is added. Final emulsion temperature should be 27° C.-30° C.

TABLE 10

| Weight | Ingredient |
|---|---|
| | Emulsion |
| 302.0 | Principal Resin 70% N.V. |
| 28.3 | Plasticizer (nonylphenoxy polypropoxyethanol (100% N.V.) |
| 162.6 | Crosslinker I (70.0% N.V.) |
| 4.84 | Acetic Acid |
| 142.8 | H₂O Portion I |
| 0.68 | Surfynol 104 (50%) in ethylene glycol monobutyl ether |
| 200.0 | H₂O Portion II |
| 103.6 | H₂O Portion III |

The bath was placed in a pilot electrodeposition tank and allowed to age for three days with circulation. The pH and conductivity of all the baths prepared from Examples 2-11 was tested. Voltage ladders were run and GM scab corrosion sets and Chrysler chipping corrosion sets were coated. Throwpower and appearance panels were coated and the results are in Table 11 together with the results of a pump stability test.

TABLE 11

| | Bath Parameters | | |
|---|---|---|---|
| Example | Throwpower (cm) | Pump Stability (Grams) | Appearance |
| 2 | 33 | >100.00 | OK |
| 3 | 29.2 | 1.91 | Rough |
| 4 | 33 | 2.69 | OK. Few craters |
| 5 | 29.8 | 0.65 | OK |
| 6 | 27.9 | 1.13 | Best appearance |
| 7 | 27.9 | 2.86 | OK |
| 8 | 29.2 | 4.03 | OK |
| 9 | 28.6 | 2.64 | Rough |
| 10 | 27.3 | 2.26 | Rough, low film build |
| 11 | 27.3 | 2.34 | OK |

The bath which employed the grind resin of Example 6 (which had a 6 minute amine add time and 60% solids value) yielded the best appearing panels. GM twenty-cycle scab corrosion data is given in Table 12.

TABLE 12

| | GM Twenty-Cycle Scab Corrosion Test Results | | |
|---|---|---|---|
| | Scribe Creep in Millimeters | | |
| Example | Phosphated Steel | Phosphated, Hotdip Galvanized Steel | Bare Galvanized Steel |
| 2 | 2.84 | 1.42 | 3.34 |
| 3 | 2.99 | 1.38 | 2.56 |
| 4 | 2.74 | 1.27 | 2.66 |
| 5 | 3.59 | 1.61 | 3.37 |
| 6 | 2.95 | 1.54 | 3.17 |
| 7 | 2.58 | 1.25 | 4.02 |
| 8 | 2.35 | 1.34 | 4.38 |
| 9 | 2.32 | 1.53 | 3.73 |
| 10 | 3.26 | 1.31 | 4.07 |
| 11 | 2.78 | 1.25 | 2.68 |

Many variations of the present invention will suggest themselves to those skilled in the art in light of the above detailed description. All such obvious variations are within the full intended scope of the appended claims. In addition, the descriptions of the proposed reactions of the ingredients of the present invention are provided for the purpose of explanation only, and are not meant to limit the scope of the invention in any way.

We claim:

1. A pigment dispersion resin comprised of the reaction product of:

(A) (i) an aromatic diglycidyl ether of the formula:

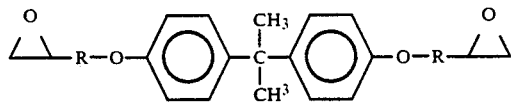

wherein R is alkyl or alkoxy having from about 1 to about 8 carbon atoms, and (ii) a bis-aryl alcohol or aromatic diol;

(B) a primary amine in the form of a mixture of one or more diamines and one or more amino alcohols, in a ratio of about 1:0.4 to about 1:5; and (C) a monoepoxide of the formula:

wherein R¹ is alkyl having about 4 to about 24 carbon atoms or aryl substituted with a straight or branched alkyl chain containing about 4 to 24 carbon atoms.

2. The pigment dispersion resin of claim 1, wherein at least one of the amino alcohols is an aminopolyalkoxy alcohol and the ratio of said amino alcohol or said aminopolyalkoxy alcohol to said diamine is from about 1:0.67 to about 1:1.5.

3. A pigment dispersion resin comprised of the reaction product of:

(A) (i) an aromatic diglycidyl ether of the formula:

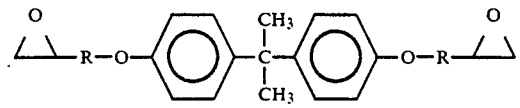

wherein R is alkyl or alkoxy having 1 to 8 carbon atoms, and (ii) a bis-aryl alcohol or aromatic diol;

(B) a primary amine in the form of a mixture of dimethylaminopropylamine and a polyglycolamine in a ratio of about 1:0.4 to about 1:5; and (C) a monoepoxide of the formula:

wherein R¹ is alkyl having about 4 to 24 carbon atoms or aryl substituted with a straight or branched alkyl chain containing about 4 to about 24 carbon atoms.

4. The pigment dispersion resin of claim 3, wherein said monoepoxide comprises nonylphenolglycidyl ether.

5. The pigment dispersion resin of claim 4, wherein said bis-aryl alcohol or aromatic diol comprises one or more of hydroquinone, bisphenol A, or resorcinol.

6. The pigment dispersion resin of claim 5 which is neutralized to a pH of about 6.

7. A pigment dispersion resin, comprising the reaction product of (A) the reaction product of the diglycidyl ether of bisphenol A and a bis-aryl alcohol or aromatic diol, said bis-aryl alcohol or aromatic diol being selected from the group consisting of one or more of bisphenol A, hydroquinone and resorcinol, in a ratio from about 8:1 to about 1.2:1 of said diglycidyl ether of bisphenol A to said bis-aryl alcohol or aromatic alcohol;

(B) a primary amine mixture comprising one or more diamines and one or more amino alcohols; the ratio of (B) to (A) being from about 0.6:1 to about 1.2:1; and (C) a monoepoxide selected from the group consisting of one or more alkylaryl epoxides, the ratio of said primary amine (B) to said monoepoxide (C) being from about 1.4 to about 2.4 equivalents of primary amine to monoepoxide.

8. The pigment dispersion resin of claim 7 wherein the monoepoxide component (C) is selected from nonylphenolglycidyl ether or 2-ethylhexylglycidyl ether.

* * * * *